US009178547B1

(12) United States Patent
Sorsby

(10) Patent No.: US 9,178,547 B1
(45) Date of Patent: Nov. 3, 2015

(54) MITIGATING INTERMODULATION DISTORTION IN A RECEIVER

(71) Applicant: William B. Sorsby, Cedar Rapids, IA (US)

(72) Inventor: William B. Sorsby, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 88 days.

(21) Appl. No.: 14/058,033

(22) Filed: Oct. 18, 2013

(51) Int. Cl.
H04B 1/06 (2006.01)
H04B 1/10 (2006.01)

(52) U.S. Cl.
CPC ................................. *H04B 1/1036* (2013.01)

(58) Field of Classification Search
CPC ......... H04B 1/10; H04B 1/1027; H03G 3/301
USPC ............. 455/501, 63.1, 130, 136, 137, 232.1, 455/234, 240.1, 245.1, 278.1, 296, 234.1
See application file for complete search history.

(56) References Cited

U.S. PATENT DOCUMENTS 6,172,564 B1* 1/2001 Rzyski ........................... 330/149
8,509,629 B2* 8/2013 Zou et al. ....................... 398/208
2009/0247106 A1* 10/2009 Da Graca et al. .......... 455/240.1

OTHER PUBLICATIONS

Wikipedia, Automatic Gain Control, en.wikipedia.org/wiki/Automatic_gain_control, retrieved on Sep. 30, 2013, 4 pages.
Wikipedia, Intermodulation, Mar. 12, 2013, 6 pages.

* cited by examiner

Primary Examiner — Tuan Pham
(74) Attorney, Agent, or Firm — Angel N. Gerdzhikov; Donna P. Suchy; Daniel M. Barbieri

(57) ABSTRACT

Systems and methods for mitigating intermodulation distortion in a receiver include receiving, at processing electronics, a radio frequency signal. An envelope of the received signal is detected to form a rectified envelope signal. A portion of the envelope signal attributable to intermodulation distortion may be isolated from the envelope signal. The isolated distortion may be used to reduce the gain of the received radio frequency signal.

20 Claims, 5 Drawing Sheets

MITIGATING INTERMODULATION DISTORTION IN A RECEIVER

BACKGROUND

The present disclosure relates generally to radio frequency receivers. More particularly, the present disclosure relates to mitigating the effects of intermodulation distortion in a radio frequency receiver, such as a wideband receiver.

The use of wideband signals has increased considerably in recent years across a number of different industries. For example, wideband signals are often employed in communication systems to support higher data rates since wideband signals afford greater bandwidths over that of narrowband signals. Communication technologies such as spread spectrum techniques also utilize wideband signals to accomplish secure communications. In another example, wideband signals may be used in radar systems to afford greater degrees of precision over narrowband radar systems.

One troublesome source of distortion in a wideband system is intermodulation distortion. Ever-present and inescapable non-linearities in a wideband system may cause the generation of additional spurious signals. These non-linearities, while generally small, may exist even in the so-called linear range of an amplifier and well below the saturation point of the amplifier. Typically, a single signal at an off-channel frequency can be filtered out at the intermediate frequency and will not "spill over" on-channel, so long as the signal level does not exceed the saturation point of the circuitry of the system. In some cases, however, two or more signals at off-channel frequencies can generate a third frequency, a spurious signal that falls on-channel, resulting in intermodulation distortion.

Intermodulation distortion is particularly detrimental in wideband systems over that of narrowband systems. First, nearly all wideband systems utilize only a small number of channel assignments. Multiple off-channel signals generating intermodulation distortion are likely to produce a signal that falls on a desired channel used by the system. Second, many long distance wideband receivers utilize high gain amplifiers in their front ends to achieve the very low noise figures needed for link closure. Consequently, such receivers may go into compression at low input levels leading to intermodulation distortion generation at low input signal levels. Accordingly, applicant has discovered that there may be a need for systems and methods that mitigate intermodulation distortion in a radio receiver, such as a wideband receiver.

SUMMARY

One embodiment of the present disclosure relates to a method of mitigating intermodulation distortion in a receiver. The method includes receiving, at processing electronics, a radio frequency signal. The method also includes rectifying the received signal to form a rectified envelope signal and distortion components. The method further includes isolating, by the processing electronics, the distortion components attributable to intermodulation distortion. The method additionally includes using the isolated distortion components to reduce the gain of the received signal.

Another embodiment of the present disclosure relates to a system for mitigating intermodulation distortion in a receiver. The system includes processing electronics configured to receive a radio frequency signal. The processing electronics are also configured to rectify the received signal to form a rectified envelope signal and distortion components. The processing electronics are further configured to isolate a portion of the rectified envelope signal attributable to intermodulation distortion components. The processing electronics are additionally configured to use the isolated distortion components to reduce the gain of the received signal.

A further embodiment of the present disclosure relates to a computer-readable storage medium having instructions stored therein, the instructions being executable by a processor to cause the processor to perform operations. The operations include receiving a radio frequency signal. The operations also include rectifying the received signal to form a rectified envelope signal and distortion components. The operations further include isolating the distortion components attributable to intermodulation distortion. The operations additionally include using the isolated distortion components to reduce the gain of the received signal.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION

Referring generally to the Figures, systems and methods for mitigating intermodulation distortion in a receiver is disclosed. In some embodiments, a portion of a received signal potentially contributing to intermodulation distortion generation may be isolated by processing electronics. The processing electronics may use the isolated distortion signal to decrease the gain of the received wideband signal, thereby mitigating the intermodulation distortion present in the received signal. While many embodiments are described herein regarding the mitigation of intermodulation distortion in a wideband communication system, the techniques disclosed herein may be applied to any form of radio frequency receiver, according to other embodiments. For example, the techniques disclosed herein may also be applied to radio frequency receivers in radar systems, cellular systems, narrowband systems, or any other system that receives radio frequency signals.

Figure 1:
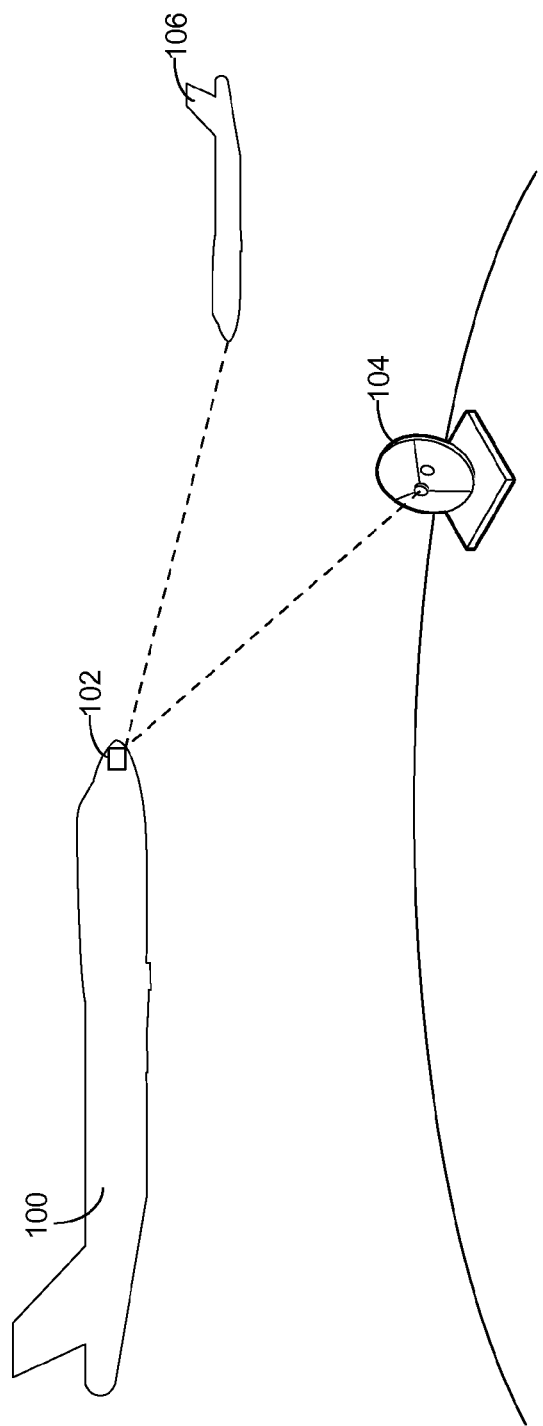
FIG. 1 is an illustration of a radio frequency communication system, according to an exemplary embodiment.

Referring now to FIG. 1, an illustration of a radio frequency communication system is shown, according to one embodiment. As shown, various entities may employ radio frequency communication signals to convey data between the different entities. For example, an aircraft 100 may communicate with a ground-based communication station 104. Similarly, aircraft 100 may communicate with another airborne aircraft 106. In other examples, other entities that may employ radio frequency communication signals can include land-based vehicles, sea-based vehicles, space-based vehicles or devices (e.g., satellites, spacecraft, etc.), personal communication devices, unmanned vehicles (e.g., an unmanned aircraft, an unmanned submarine, etc.), or the like. In one embodiment, communications between aircraft 100 and station 104 may be separate from the communications between aircraft 100 and aircraft 106. In another embodiment, aircraft 100 may act as a relay between ground-based station 104 and aircraft 106. In other words, aircraft 100 may forward communications received from aircraft 106 to ground-based station 104 and vice-versa.

Each of aircraft 102, 106 and ground-based station 104 may be equipped with processing electronics configured to transmit and/or receive radio frequency communications, according to various embodiments. As shown, aircraft 100 includes processing electronics 102 configured to receive wideband radio frequency signals from ground-based station 104 or aircraft 106 and convert the received signals into data for use within aircraft 100. For example, aircraft 100 may receive a video feed from aircraft 106 via a radio frequency signal. In some embodiments, processing electronics 102 is also be configured to convert data local to aircraft 100 into a radio frequency signal and transmit the signal to ground-based station 104 or to aircraft 106.

Processing electronics 102 includes various hardware to support the transmittal or receipt of radio frequency signals. For example, processing electronics 102 may include front-end electronics such as an antenna, one or more amplifiers, one or more filters, etc. that are configured to receive a radio frequency signal and perform operations on the signal. In one embodiment, processing electronics 102 includes circuitry configured to convert a radio frequency signal into data based on a modulation of the signal. For example, processing electronics 102 may include circuitry configured to demodulate a frequency modulated (FM) signal, to extract data from the signal.

According to various embodiments, processing electronics 102 are configured to mitigate intermodulation distortion in a received radio signal. In some embodiments, processing electronics 102 identifies the presence of intermodulation distortion in a received radio frequency signal. Based on the identified distortion, processing electronics 102 decreases the gain of the received signal thereby mitigating the intermodulation distortion in one embodiment. In one implementation, processing electronics 102 includes a feed-forward envelope detector with a coupled feed-forward path that isolates the portion of the received signal attributable to intermodulation distortion. The isolated distortion signal is then used to decrease the gain of the received signal.

Figure 2A:
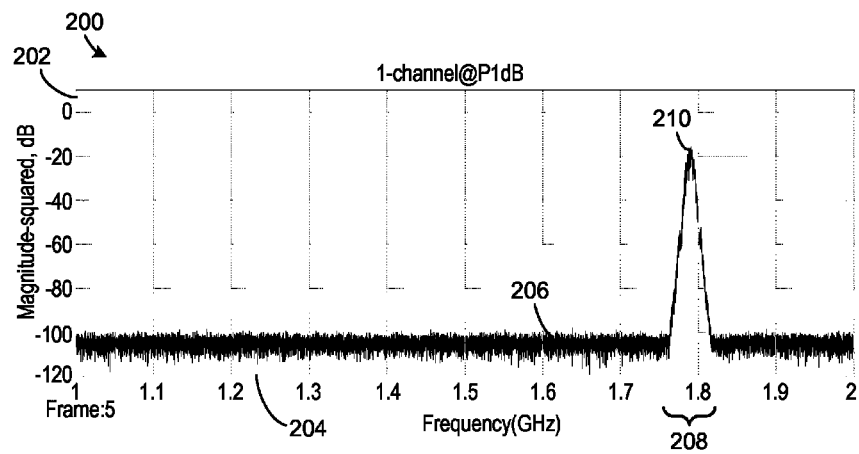
FIG. 2A is an illustration of a strong wideband signal, according to an exemplary embodiment.
Figure 2B:
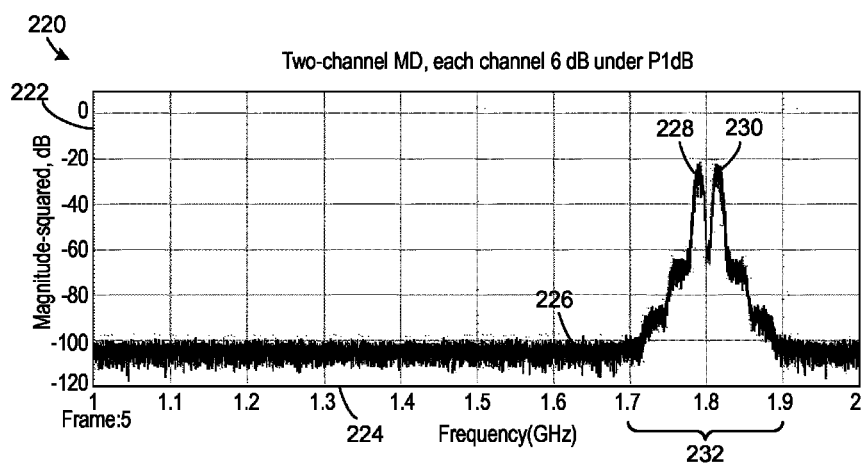
FIG. 2B is an illustration of two wideband signal that are weaker than the signal in FIG. 2A and demonstrate intermodulation distortion, according to an exemplary embodiment.

Referring now to FIGS. 2A-B, illustrations are shown of wideband signals received by a receiver, according to various embodiments. In FIG. 2A, an illustration 200 depicts a spectrum 206 containing a wideband signal 210, according to one embodiment. In FIG. 2B, an illustration 220 depicts a spectrum 226 containing two wideband signals that are slightly weaker than signal 210 in FIG. 2A and demonstrate intermodulation distortion. Illustration 200 is a two dimensional plot mapping the gain of signal 210 along a vertical axis 202 and the frequency components of signal 210 along a horizontal axis 204. As shown in illustration 200, axis 202 is measured in decibels (dB) and axis 204 is measured in gigahertz (GHz), although other measures of gain and frequency may be used in other embodiments. Similarly, illustration 220 is a two dimensional plot along a vertical gain axis 222 measured in dB and a horizontal axis 224 measured in GHz. In some embodiments, signal 210 is received by a radio frequency receiver having an amplifier that is operating at its P1 dB compression point. In other words, the amplifier may be operating at the point at which the gain of the amplifier drops by 1 dB from its small signal value.

As shown in illustration 200, the signal spectrum 206 is formed from a received signal that operates around a center channel frequency. At center frequency, spectrum 206 demonstrates a peak amplitude level of approximately −17 dB. Surrounding the center frequency is a bandwidth region 208 that spans from approximately 1.77 GHz to 1.82 GHz, giving a bandwidth of approximately 0.05 GHz, where the signal exceeds noise. As illustrated, the amplitude of signal 210 falls off within bandwidth region 208. Thus, spectrum 206 within bandwidth region 208 is well defined and may be processed by the receiver to convert received signal 210 into usable data (e.g., video data, audio data, etc.).

In illustration 220, spectrum 226 is formed from two slightly weaker signals than that of spectrum 206. As shown, first and second signals operating on channel frequencies 228 and 230, respectively, combine to form a much broader signal across spectrum 226. Each of the signals on channel frequencies 228, 230 are lower in amplitude than the peak of signal 210 shown in FIG. 1, each demonstrating an additional −6 dB under the P1 dB point of the amplifier of the receiver. In other words, each peak signal in spectrum 226 is one fourth the power of signal 210.

Spectrum 226 demonstrates a much wider bandwidth region 232 in comparison to bandwidth region 208 of spectrum 206. Bandwidth region 232 may span from approximately 1.7 GHz to 1.9 GHz, giving a total bandwidth of spectrum 226 of 0.20 GHz. In one embodiment, bandwidth region 232 is considerably greater than that of the two signals on channel frequencies 228, 230 combined. In comparison to the bandwidth of spectrum 206, the bandwidth of spectrum 226 is also approximately four times that seen in spectrum 206. In addition, spectrum 226 within bandwidth region 232 exhibits several sidebands caused by intermodulation distortion. For example, spectrum 226 includes sidebands around 1.74 GHz, 1.78 GHz, 1.82 GHz, and 1.86 GHz that may be caused by intermodulation distortion. According to various embodiments, the wider bandwidth of spectrum 226 is approximately ten percent of the center frequency of signal 210.

In general, a wider bandwidth caused by intermodulation distortion increases the apparent noise floor in the receiver. This may significantly degrade the sensitivity of the receiver to weak signals. In addition, a bandwidth increase due to intermodulation distoration may approach or exceed the total spectrum allotted for all channels of a particular radio service. Accordingly, intermodulation distortion may significantly impact the performance of a wideband receiver system.

Figure 3:
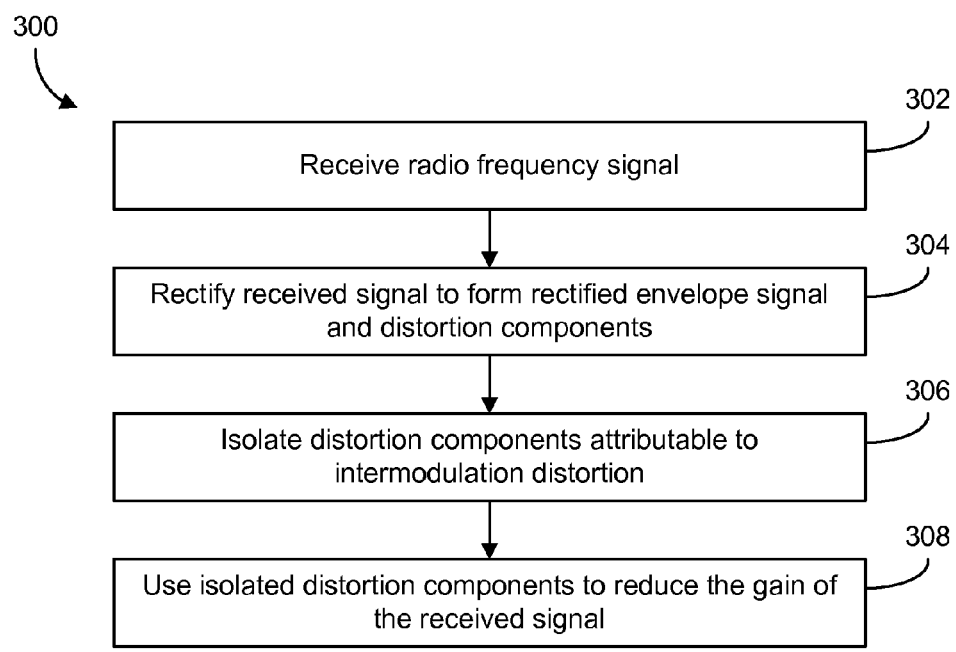
FIG. 3 is a flow chart of a process for mitigating intermodulation distortion, according to an exemplary embodiment.

Referring now to FIG. 3, a flow chart of a process 300 for mitigating intermodulation distortion is shown, according to an exemplary embodiment. In general, process 300 allows a receiver system to isolate and remove the effects of intermodulation distortion from a received signal in one embodiment. According to various embodiments, process 300 may be implemented by processing electronics configured to perform process 300. In one embodiment, process 300 is implemented via circuitry specifically designed to perform process 300. In another embodiment, process 300 is implemented by a processing circuit that contains stored machine instructions. When executed by a processor of the circuit, the stored instructions cause one or more processors to implement process 300.

Process 300 includes receiving a radio signal (step 302). In one embodiment, the received signal is a wideband signal. In general, a wideband signal refers to any radio signal having a message bandwidth that exceeds the coherence bandwidth of the channel on which the signal is communicated. In other embodiments, the received signal is a narrowband signal or an ultra-wideband signal. The received signal may contain information such as audio data, video data, radar return data, sensor data, electronic communication data, or any other form of data that may be encoded and transmitted as a radio signal. For example, communication data may be converted into a high frequency, wideband radio signal and transmitted to the receiver. In various embodiments, the radio signal may be received by one or more antennas of the receiver and converted into corresponding electrical signals for further processing. In other embodiments, the received signal may be a received signal that has been preprocessed by any number of front-end systems of the receiver. For example, the received signal may be a radio signal that has been received by an antenna and filtered, amplified, digitized, or demodulated by front end circuitry of the receiver.

Process 300 includes rectifying the received signal to form an envelope signal and distortion components (step 304). In general, the envelope of a received signal refers to a signal that outlines the minimum or maximum amplitudes of received signal. In one embodiment, the envelope signal may be formed by an envelope detector, i.e., circuitry configured to take an electrical signal as an input and output a signal that corresponds to the envelope of the input signal. If present in the received signal, the distortion components (e.g., distortion products) attributable to intermodulation distortion may also be formed via rectification. In one embodiment, the envelope detector includes a capacitor in series with a diode which rectifies the signal. The diode acts as a rectifier that prevents either positive or negative portions of the input signal from passing through, resulting in the envelope signal tracking the upper or lower envelope of the input signal, respectively. In another embodiment, the envelope detector may be implemented as machine instructions that cause one or more processors (e.g., digital signal processors) to perform envelope detection on a digitized form of the input signal.

Process 300 includes isolating the distortion components attributable to intermodulation distortion (step 306). In various embodiments, a bandpass filter may be used to isolate and filter out intermodulation distortion present in the rectified envelope signal. The passband for the filter may be sized according to the expected bandwidth of the distortion products. In some cases, the passband of the filter may correspond to the additional bandwidth that may result when intermodulation distortion is present. For example, each of the signals in FIG. 2B corresponding to channel frequencies 228, 230 in spectrum 226 may have expected bandwidths of 0.05 GHz. In such a case, the bandpass filter may be configured to filter out the portions of the envelope signal that fall within the expected bandwidths of channel frequencies 228, 230. In other words, the bandpass filter may isolate the portion of the rectified envelope signal that corresponds to the intermodulation distortion in one embodiment.

Process 300 includes using the isolated distortion components to reduce the gain of the received signal (step 308). According to various embodiments, reducing the gain through an amplifier also decreases the effects of intermodulation distortion on the signal (e.g., by eliminating or reducing the amplitudes of the sidebands caused by the intermodulation distortion). In doing so, the bandwidth of the received signal may also be reduced. The isolated portion of the signal attributable to the distortion may be used to reduce the gain of the received signal by a proportionate amount or according to any other function that relates the isolated distortion to a reduction in power. In some embodiments, the resulting portion of the envelope signal with the removed distortion may be further processed and combined with the envelope signal. For example, the output of the passband filter may be provided to another envelope detector that converts the distortion into a corresponding direct current (DC) level. In one embodiment, the DC signal may be further filtered using a low-pass filter to smooth and average the DC signal prior to using the signal to decrease the gain of the received signal.

Figure 4:
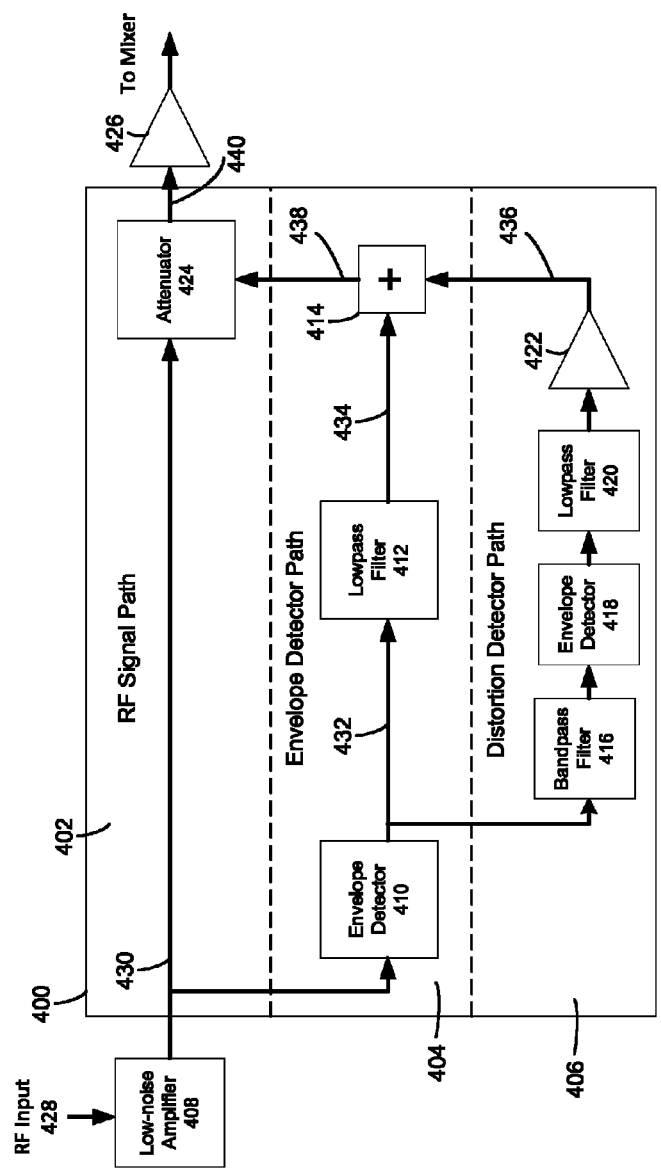
FIG. 4 is a general schematic block diagram of processing electronics configured to mitigate intermodulation distortion, according to an exemplary embodiment.

Referring now to FIG. 4, a general schematic block diagram of processing electronics 400 configured to mitigate intermodulation distortion is shown, according to an exemplary embodiment. In general, processing electronics 400 may be part of a radio receiver, such as a wideband receiver, or part of an electronic system configured to receive and process radio waves. In one embodiment, processing electronics 400 is implemented in whole or in part using hardware components. In another embodiment, processing electronics is implemented via one or more processors that execute instructions stored in one or more memory devices. When executed, the instructions cause the one or more processors to perform the operations described herein with respect to processing electronics 400.

As shown, an input signal 428 may be received by a low-noise amplifier 408. In various embodiments, input signal 428 is generated in response to one or more antennas detecting a radio frequency signal and converting the received signal into an electronic signal. In some embodiments, input signal 428 may be preprocessed by front end electronics of the receiver that perform filtering, buffering, or other operations on signal 428. Low-noise amplifier 408 is configured to amplify input signal 428 to produce a signal 430 which is received as an input by processing electronics 400.

According to various embodiments, processing electronics 400 implements a feed-forward control system that adjusts the gain of received signal 430. The control system includes a signal path 402 in which received signal 430 is provided to an attenuator 424. Attenuator 424 is configured to reduce the gain of received signal 430 by an amount controlled by an envelope detector path 404 in a feed-forward manner. Envelope detector path 404 may include an envelope detector 410 configured to generate an envelope signal 432 that follows the maximum or minimum amplitude of received signal 430. In various embodiments, envelope detector 410 is a diode mixer or other form of circuitry that outputs a rectified signal in response to a change in the amplitude of received signal 430. In one embodiment, envelope signal 432 is provided to a lowpass filter 412 that averages or smooths envelope signal 432 to form a smoothed envelope signal 434. In turn, attenuator 424 may reduce the gain of received signal 430 accordingly based on signal 434 (e.g., signal 434 itself may be an attenuator control signal). For example, assume that the amplitude of received signal 430 experiences a sharp increase. In such a case, the gain of received signal 430 may be decreased accordingly to keep the level of the output signal from processing electronics 400 below a certain threshold. In one embodiment, signal path 402 and envelope detector path 404 implement a gain control strategy in which output signal 440 from processing electronics 400 is relatively constant. If received signal 430 is a weaker signal, no attenuation is applied by attenuator 424, thereby allowing the weak signal to operate at maximum amplification. If received signal 430 is a stronger signal, however, attenuator 424 may decrease the gain of received signal 430 by a proportionate amount to keep output signal 440 relatively constant.

In one embodiment, processing electronics 400 also includes a distortion detector path 406 coupled to the control system formed by signal path 402 and envelope detector path 404. In some embodiments, distortion detector path 406 forms a second feed-forward control path that is coupled to the control paths 402, 404. Distortion detector path 406 may receive envelope signal 432 as input. In general, distortion detector path 406 is configured to isolate a portion of envelope signal 432 attributable to intermodulation distortion. If a distortion signal is isolated by distortion detector path 406, distortion detector path 406 may output a signal 436 based on the isolated distortion. In one embodiment, signal 436 may itself act as an attenuator control signal by attenuator 424. In another embodiment, control signal 436 may be combined with control signal 434 from envelope detector path 404 at a summer 414 to produce a combined attenuator control signal 438. Signal 438 may be used by attenuator 424 to decrease the gain of received signal 430 in relation to the strength of signal 438. In other words, processing electronics 400 may decrease the gain of received signal 430 if the amplitude of received signal 430 is beyond a certain threshold (e.g., via the first control path along envelope detector path 404), if intermodulation distortion is detected in rectified signal 432 (e.g., via the second control path along distortion detector path 406), or both conditions exist.

According to various embodiments, distortion detector path 406 includes a bandpass filter 416 that receives envelope signal 432 from envelope detector 410. Bandpass filter 416 is configured to isolate a portion of envelope signal 432 attributable to intermodulation distortion. In one embodiment, the passband of bandpass filter 416 may be based on an expected bandwidth of potential intermodulation distortion products minus the baseband spectrum. For example, bandpass filter 416 may be configured to extract portions of spectrum 226 shown in FIG. 2B that correspond with potential intermodulation distortion products of the signal (e.g., a portion of spectrum 226 having a frequency of 1.775 GHz or less or a portion of spectrum 226 having a frequency of 1.825 GHz or higher).

The output of bandpass filter 416 corresponding to the isolated distortion may be processed in any number of ways. In one embodiment, the output of bandpass filter 416 is provided to an envelope detector 418. Envelope detector 418 may be configured to convert the isolated distortion signal into a corresponding DC level. In some embodiments, the DC signal from envelope detector 418 may be smoothed or averaged by a lowpass filter 420 and provided to a buffer 422. The output signal 436 from buffer 422 may be combined with signal 434 from envelope detector path 404 in summer 414 to generate signal 438. The output signal 440 from processing electronics 400 may be provided to any number of circuitry for further processing. In one embodiment, output signal 440 may be provided to a buffer 426 and on to a mixer.

Figure 5:
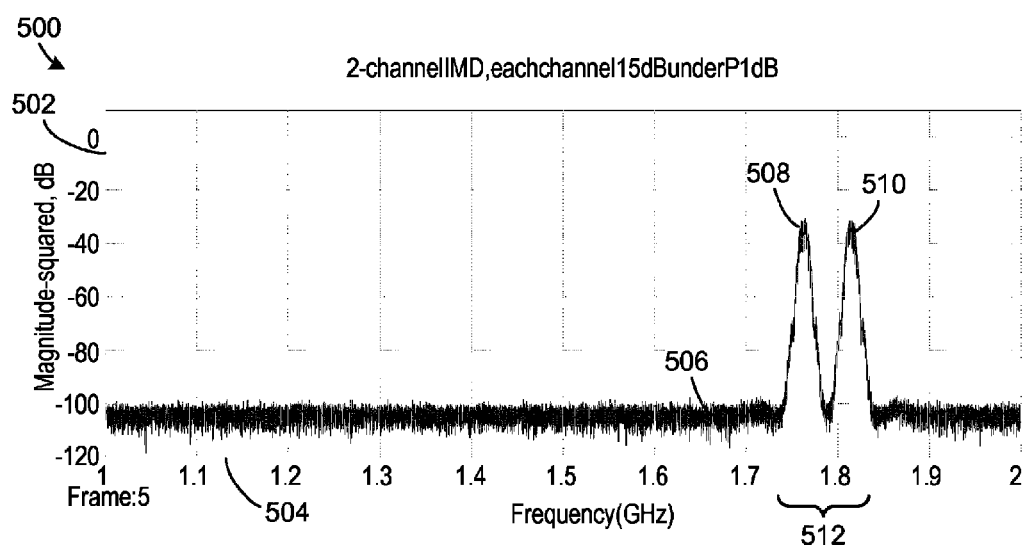
FIG. 5 is an illustration of the signal shown in FIG. 2B without intermodulation distortion, according to an exemplary embodiment.

Referring now to FIG. 5, an illustration 500 is shown the signal of FIG. 2B without intermodulation distortion, according to one embodiment. As shown, illustration 500 is a two dimensional plot of a gain measured in dB along a vertical axis 502 in relation to a frequency measured in GHz along a horizontal axis 504. In various embodiments, the intermodulation distortion present in spectrum 226 is used to reduce the gain of signals 228, 230 in spectrum 226 to form spectrum 506. For example, spectrum 506 may be generated by processing electronics 400 shown in FIG. 4 using signals 228, 230 of FIG. 2B as input signals. Similar to spectrum 226, spectrum 506 is formed as the product of two signals operating on nearby channel frequencies 508, 510 (e.g., the same signals shown in FIG. 2B at channel frequencies 228, 230).

According to various embodiments, the gain of a radio frequency signal may be decreased by any amount as a function of the intermodulation distortion present in the signal. In doing so, the effects of intermodulation distortion may be mitigated by partially or wholly removing the distortion from the signal. In the example shown, the gain of the signals in spectrum 506 have been reduced by 9 dB over that of those in spectrum 226 based on the isolated intermodulation distortion present in the rectified signals. Consequently, the intermodulation distortion observed in spectrum 226 is largely removed from spectrum 506. In addition, the bandwidth 512 of spectrum 506 has been greatly reduced from that of bandwidth 232 of spectrum 226.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Further, discussion of signal and distortion bandwidth, frequency ranges, and amplitude are exemplary only and do not limit the scope of the claims.

What is claimed is:

1. A method of mitigating intermodulation distortion in a receiver comprising:
   receiving, at processing electronics, a radio frequency signal;
   rectifying, by the processing electronics, the received signal to form an envelope signal and distortion components;
   isolating, by the processing electronics, the distortion components attributable to intermodulation distortion; and
   using the isolated distortion components to reduce the gain of the received signal.

2. The method of claim 1, further comprising:
   generating a first attenuator control signal within a first feed-forward control path based on the envelope signal; and
   providing the first attenuator control signal to an attenuator to reduce the gain of the received signal.

3. The method of claim 2, further comprising:
   using a second control path coupled to the first feed-forward control path to generate a second attenuator control signal based on the isolated distortion components; and
   providing the second attenuator control signal to the attenuator to reduce the gain of the received signal.

4. The method of claim 3, further comprising:
   combining the first and second attenuator control signals to generate a combined attenuator control signal; and
   providing the combined control signal to the attenuator to reduce the gain of the received signal.

5. The method of claim 1, wherein the received signal is a wideband signal.

6. The method of claim 1, wherein the received signal contains communication data.

7. A system for mitigating intermodulation distortion in a receiver comprising processing electronics configured to receive a radio frequency signal, wherein the processing electronics are configured to rectify the received signal to form a rectified envelope signal and distortion components, wherein the processing electronics are configured to isolate the distortion components attributable to intermodulation distortion, and wherein the processing electronics are configured to use the isolated distortion components to reduce the gain of the received signal.

8. The system of claim 7, wherein the processing electronics are configured to generate a first attenuator control signal within a first feed-forward control path based on the envelope signal, and wherein the processing electronics are configured to provide the first attenuator control signal to an attenuator to reduce the gain of the received signal.

9. The system of claim 8, wherein the processing electronics are configured to use a second control path coupled to the first feed-forward control path to generate a second attenuator control signal based on the isolated distortion components, and wherein the processing electronics are configured to provide the second attenuator control signal to the attenuator to reduce the gain of the received signal.

10. The system of claim 9, wherein the processing electronics are configured to combine the first and second attenuator control signals to generate a combined attenuator control signal, and wherein the processing electronics are configured to provide the combined control signal to the attenuator to reduce the gain of the received signal.

11. The system of claim 7, wherein the received signal is a wideband signal.

12. The system of claim 7, wherein the received signal contains communication data;
    providing the combined control signal to the attenuator to reduce the gain of the received signal.

13. The system of claim 7, wherein the processing electronics comprise a processor and a memory.

14. The system of claim 7, further comprising an amplifier configured to generate the radio frequency signal received by the processing electronics.

15. A non-transitory computer-readable storage medium having instructions stored therein, the instructions being executable by a processor to cause the processor to perform operations comprising:
    receiving a radio frequency signal;
    rectifying the radio frequency signal to form a rectified envelope signal and distortion components;
    isolating the distortion components attributable to intermodulation distortion; and
    using the isolated distortion components to reduce the gain of the radio frequency signal.

16. The non-transitory computer-readable storage medium of claim 15, wherein the operations further comprise:
    generating a first attenuator control signal within a first feed-forward control path based on the envelope signal; and
    providing the first attenuator control signal to an attenuator to reduce the gain of the radio frequency signal.

17. The non-transitory computer-readable storage medium of claim 16, wherein the operations further comprise:
    using a second control path coupled to the feed-forward control path to generate a second attenuator control signal based on the isolated distortion components; and
    providing the second attenuator control signal to the attenuator to reduce the gain of the radio frequency signal.

18. The non-transitory computer-readable storage medium of claim 16, wherein the operations further comprise:
    combining the first and second attenuator control signals to generate a combined attenuator control signal; and
    providing the combined control signal to the attenuator to reduce the gain of the radio frequency signal.

19. The non-transitory computer-readable storage medium of claim 15, wherein the radio frequency signal is a wideband signal.

20. The non-transitory computer-readable storage medium of claim 15, wherein the radio frequency signal contains communication data.

\* \* \* \* \*